(12) United States Patent
Castillo et al.

(10) Patent No.: US 9,589,184 B1
(45) Date of Patent: Mar. 7, 2017

(54) METHOD, APPARATUS, AND COMPUTER PROGRAM PRODUCT FOR CLASSIFICATION OF DOCUMENTS

(71) Applicant: Groupon, Inc., Chicago, IL (US)

(72) Inventors: Roger Henry Castillo, Palo Alto, CA (US); Brian Andrew Humphrey, East Palo Alto, CA (US)

(73) Assignee: Groupon, Inc., Chicago, IL (US)

( * ) Notice: Subject to any disclaimer, the term of this patent is extended or adjusted under 35 U.S.C. 154(b) by 412 days.

(21) Appl. No.: 13/969,008

(22) Filed: Aug. 16, 2013

Related U.S. Application Data

(60) Provisional application No. 61/683,804, filed on Aug. 16, 2012, provisional application No. 61/683,807, filed on Aug. 16, 2012, provisional application No. 61/683,969, filed on Aug. 16, 2012, provisional application No. 61/683,972, filed on Aug. 16, 2012.

(51) Int. Cl.
   *G06K 9/00* (2006.01)
(52) U.S. Cl.
   CPC .............................. *G06K 9/00456* (2013.01)
(58) Field of Classification Search
   None
   See application file for complete search history.

(56) References Cited

U.S. PATENT DOCUMENTS

| | | | |
|---|---|---|---|
| 7,231,405 B2 | 6/2007 | Xia | |
| 7,822,705 B2 | 10/2010 | Xia | |
| 2002/0057592 A1* | 5/2002 | Robb | G11C 11/56 365/148 |
| 2002/0152051 A1* | 10/2002 | Fukushige | G06F 17/30707 702/179 |
| 2005/0185845 A1* | 8/2005 | Luo | G06K 9/00362 382/224 |

(Continued)

OTHER PUBLICATIONS

Alves, A. O. et al., *Place Enrichment by Mining the Web*, Lecture Notes in Computer Science vol. 5859, Springer Berlin Heidelberg (2009) pp. 66-77.

(Continued)

*Primary Examiner* — Michelle Entezari
(74) *Attorney, Agent, or Firm* — Alston & Bird LLP

(57) ABSTRACT

Provided herein are systems, methods and computer readable media for classification of documents using a location hierarchy. An example method may include receiving a feature vector r that represents occurrence counts of references in a document's text to each of a group of named entities, and determining whether the document is associated with the particular location by querying, to determine a query result, using feature vector r, at least one location-specific classifier from a group of location-specific classifiers, wherein the location-specific classifier is associated with the particular location, and wherein the location-specific classifier is configured to generate a positive output value in response to receiving an input feature vector representing occurrence count of at least one reference to the particular named entity and determining that the document is associated with the particular location in an instance in which the query result includes data indicating that the positive output value was generated by the location-specific classifier that is associated with the particular location.

24 Claims, 11 Drawing Sheets

(56) References Cited

U.S. PATENT DOCUMENTS

| | | | |
|---|---|---|---|
| 2006/0206624 A1* | 9/2006 | Wang | G06F 17/3087 |
| | | | 709/245 |
| 2006/0268876 A1* | 11/2006 | Grah | H04L 47/2416 |
| | | | 370/392 |
| 2006/0282442 A1* | 12/2006 | Lennon | G06F 17/30011 |
| 2007/0288437 A1 | 12/2007 | Xia | |
| 2008/0010253 A1* | 1/2008 | Sidhu | G06F 17/30398 |
| 2012/0106800 A1* | 5/2012 | Khan | G06K 9/00651 |
| | | | 382/104 |
| 2012/0147189 A1* | 6/2012 | Zhang | G06K 9/00791 |
| | | | 348/149 |
| 2015/0131848 A1* | 5/2015 | Thirumaleshwara | G06K 9/00624 |
| | | | 382/103 |

OTHER PUBLICATIONS

Vaid, S. et al., *Spatio-textural Indexing for Geographical Search on the Web*, Lecture Notes in Computer Science vol. 3633, Springer Berlin Heidelberg (2005) pp. 218-235.

Woodward, D., *Extraction and Visualization of Temporal Information and Related Names Entities From Wikipedia*, Springs (2001) pp. 1-8

Ye, Y. et al., *iSurfer: A Focused Web Crawler Based on Incremental Learning From Positive Samples*, APWeb 204, LNCS 3007, Springer-Verlag Berlin Heilelberg (2004) pp. 122-134.

\* cited by examiner

INPUT:

Suspect in Northeast Austin SWAT call surrenders, police say

A 31-year-old man has surrendered to police after a standoff that lasted about three hours in Northeast Austin.

Austin police said officers with the fugitive unit had attempted to serve Timothy Drake with a warrant for drug possession about noon, when the man barricaded himself inside a residence on Hycreek Drive near Northeast Drive and Manor Road.

FIG. 4A

OUTPUT:

Suspect in <LOCATION Northeast Austin> <MISC SWAT> call surrenders, police say

A 31-year-old man has surrendered to police after a standoff that lasted about three hours in <LOCATION Northeast Austin>.

<LOCATION Austin> police said officers with the fugitive unit had attempted to serve <PERSON Timothy Drake> with a warrant for drug possession about noon, when the man barricaded himself inside a residence on <LOCATION Hycreek Drive> near <LOCATION Northeast Drive> and <LOCATION Manor Road>.

FIG. 4B

| | |
|---|---|
| Austin | [1 0 0 1 0 0 0 0 0 0] |
| Northeast Austin | [0 1 0 0 0 0 1 0 0 0] |
| SWAT | [1 0 0 0 0 1 0 0 0 0] |
| Hycreek Drive | [1 0 0 0 0 0 1 0 0 0] |
| Northeast Drive | [0 0 0 1 0 0 0 0 0 1] |
| Lamar Road | [0 0 0 0 0 0 1 1 0 0] |

FIG. 5B

| | |
|---|---|
| 0 | Austin |
| 1 | Northeast Austin |
| 2 | SWAT |
| 3 | Hycreek Drive |
| 4 | Northeast Drive |
| 5 | Lamar Road |

FIG. 5A

| | |
|---|---|
| Austin | 2.322 |
| Northeast Austin | 1.585 |
| SWAT | -0.5850 |
| Hycreek Drive | 1.2016 |
| Northeast Drive | -0.01291 |
| Lamar Road | 0.7384 |

FIG. 6

METHOD, APPARATUS, AND COMPUTER PROGRAM PRODUCT FOR CLASSIFICATION OF DOCUMENTS

CROSS REFERENCES TO RELATED APPLICATIONS

This application claims priority to U.S. Provisional Patent Application No. 61/683,804 titled "SYSTEM, METHOD AND COMPUTER PROGRAM PRODUCT FOR FLEXIBLE HIGH-SPEED INDEXING AND RETRIEVAL OF GEOLOCATED CONTENT" filed on Aug. 16, 2012", U.S. Provisional Patent Application No. 61/683,807, titled "SYSTEM, METHOD AND COMPUTER PROGRAM PRODUCT FOR CLASSIFICATION OF DOCUMENTS IN PLACE HIERARCHY" filed on Aug. 16, 2012", U.S. Provisional Patent Application No. 61/683,969, titled "SYSTEM, METHOD AND COMPUTER PROGRAM PRODUCT FOR RANKING WEB CONTENT BASED ON LOCAL INTEREST" filed on Aug. 16, 2012", U.S. Provisional Patent Application No. 61/683,972, titled "SYSTEM, METHOD, AND COMPUTER PROGRAM PRODUCT FOR CREATING OPTIMAL THUMBNAILS FOR WEB DOCUMENTS" filed on Aug. 16, 2012", each of which is hereby incorporated by reference.

FIELD

Embodiments of the invention relate, generally, to classification of documents using a location hierarchy.

BACKGROUND

In order to provide more relevant search results to users, it is useful to make a determination of the geographical area to which a particular publication or document is relevant. When crawling the Internet in a targeted manner for locally relevant content, this is a key qualifier. Due to the enormous amount of content present on the Internet, most of which is non-local, a targeted web crawler which does not make such a determination will waste correspondingly enormous amounts of resources crawling non-local content.

Current solutions to this problem often rely on a comprehensive toponymic database, attempting to identify and disambiguate references to places with respect to the database. This is a very difficult task, given the complexity of and variation among natural language place references, and can require significant processing. In the context of a web crawl, it is important to minimize the amount of processing required for each document, since a crawler necessarily will encounter very many documents. Through applied effort, ingenuity, and innovation, solutions to improve such methods have been realized and are described in connection with embodiments of the present invention.

BRIEF SUMMARY

In general, embodiments of the present invention provided herein include systems, methods and computer readable media for the classification of documents using a location hierarchy.

In one embodiment, a computer-implemented method may be provided, the method may comprise receiving a feature vector r that represents occurrence counts of references in a document's text to each of a group of named entities, wherein a particular named entity within the group of named entities is associated with a particular location, and determining, by a processor, whether the document is associated with the particular location by performing operations comprising querying, to determine a query result, using feature vector r, at least one location-specific classifier from a group of location-specific classifiers, wherein the location-specific classifier is associated with the particular location, and wherein the location-specific classifier is configured to generate a positive output value in response to receiving an input feature vector representing occurrence count of at least one reference to the particular named entity, and determining that the document is associated with the particular location in an instance in which the query result includes data indicating that the positive output value was generated by the location-specific classifier that is associated with the particular location.

In some embodiments, the operations may further comprise determining that the document is not associated with the particular location in an instance in which the query result does not include data indicating that the positive output value was generated by the location-specific classifier that is associated with the particular location. In some embodiments, the particular location is from a hierarchy of locations, each location respectively being associated with a corresponding location-specific classifier from the group of location-specific classifiers, wherein each location within the hierarchy represents a more specific location than its parent location. In some embodiments, each of the group of location-specific classifiers is a trainable classifier adapted using supervised learning, and wherein the location-specific classifier that is associated with the particular location is adapted based on a training data set of exemplary feature vectors, each exemplary feature vector respectively representing occurrence counts of references in an exemplary document's text to each of the group of named entities.

In some embodiments, the exemplary document is determined, based on the hierarchy of locations, to be associated with a relevant location to the particular location. In some embodiments, the method may further comprise applying a weighting scheme to improve performance of the location-specific classifier that is associated with the particular location. In some embodiments, feature vector r is a vector of values with each element of feature vector r being an occurrence count of references within the document's text to one of the group of named entities, each element having an index position.

In some embodiments, generating the feature vector r comprises for each named entity in the group of named entities, generating a reference bit vector for each reference within the document's text to the named entity, and calculating a sum vector from the generated reference bit vectors. In some embodiments, feature vector r of a dimensionality d that is equal to the size of the group of named entities, and wherein the reference bit vector for a named entity is a bit vector of dimensionality d with a value of 1 at the bit vector element index position corresponding to the feature vector r element index position representing the occurrence count of references to the named entity. In some embodiments, feature vector r is a vector of values of a fixed dimensionality d that is less than the size of the group of named entities, and wherein the reference bit vector for a named entity is a bit vector of dimensionality d with a value of 1 at each of k index positions, where k is greater than or equal to 2, and the k index positions are chosen at random to indicate the named entity.

In another embodiment, a system may be provided, the system comprising one or more computers and one or more storage devices storing instructions that are operable, when executed by the one or more computers, to cause the one or more computers to perform first operations comprising receiving a feature vector r that represents occurrence counts of references in a document's text to each of a group of named entities, wherein a particular named entity within the group of named entities is associated with a particular location, and determining whether the document is associated with the particular location by performing second operations comprising querying, to determine a query result, using feature vector r, at least one location-specific classifier from a group of location-specific classifiers, wherein the location-specific classifier is associated with the particular location, and wherein the location-specific classifier is configured to generate a positive output value in response to receiving an input feature vector representing occurrence count of at least one reference to the particular named entity, and determining that the document is associated with the particular location in an instance in which the query result includes data indicating that the positive output value was generated by the location-specific classifier that is associated with the particular location.

In some embodiments, the second operation further comprises determining that the document is not associated with the particular location in an instance in which the query result does not include data indicating that the positive output value was generated by the location-specific classifier that is associated with the particular location. In some embodiments, the particular location is from a hierarchy of locations, each location respectively being associated with a corresponding location-specific classifier from the group of location-specific classifiers, wherein each location within the hierarchy represents a more specific location than its parent location.

In some embodiments, each of the group of location-specific classifiers is a trainable classifier adapted using supervised learning, and wherein the location-specific classifier that is associated with the particular location is adapted based on a training data set of exemplary feature vectors, each exemplary feature vector respectively representing occurrence counts of references in an exemplary document's text to each of the group of named entities. In some embodiments, the exemplary document is determined, based on the hierarchy of locations, to be associated with a relevant location to the particular location. In some embodiments, the instructions may be further operable, when executed by the one or more computers, to cause the one or more computers to apply a weighting scheme to improve performance of the location-specific classifier that is associated with the particular location.

In some embodiments, feature vector r is a vector of values with each element of feature vector r being an occurrence count of references within the document's text to one of the group of named entities, each element having an index position. In some embodiments, generating the feature vector r comprises, for each named entity in the group of named entities, generating a reference bit vector for each reference within the document's text to the named entity, and calculating a sum vector from the generated reference bit vectors. In some embodiments, feature vector r of a dimensionality d that is equal to the size of the group of named entities, and wherein the reference bit vector for a named entity is a bit vector of dimensionality d with a value of 1 at the bit vector element index position corresponding to the feature vector r element index position representing the occurrence count of references to the named entity. In some embodiments, feature vector r is a vector of values of a fixed dimensionality d that is less than the size of the group of named entities, and wherein the reference bit vector for a named entity is a bit vector of dimensionality d with a value of 1 at each of k index positions, where k is greater than or equal to 2, and the k index positions are chosen at random to indicate the named entity.

In another embodiment, a computer program product may be provided, the computer program product encoded on a computer-readable medium, operable to cause data processing apparatus to perform first operations comprising receiving a feature vector r that represents occurrence counts of references in a document's text to each of a group of named entities, wherein a particular named entity within the group of named entities is associated with a particular location, and determining whether the document is associated with the particular location by performing second operations comprising querying, to determine a query result, using feature vector r, at least one location-specific classifier from a group of location-specific classifiers, wherein the location-specific classifier is associated with the particular location, and wherein the location-specific classifier is configured to generate a positive output value in response to receiving an input feature vector representing occurrence count of at least one reference to the particular named entity, and determining that the document is associated with the particular location in an instance in which the query result includes data indicating that the positive output value was generated by the location-specific classifier that is associated with the particular location.

In some embodiments, the second operations further comprising determining that the document is not associated with the particular location in an instance in which the query result does not include data indicating that the positive output value was generated by the location-specific classifier that is associated with the particular location. In some embodiments, the particular location is from a hierarchy of locations, each location respectively being associated with a corresponding location-specific classifier from the group of location-specific classifiers, wherein each location within the hierarchy represents a more specific location than its parent location.

In some embodiments, each of the group of location-specific classifiers is a trainable classifier adapted using supervised learning, and wherein the location-specific classifier that is associated with the particular location is adapted based on a training data set of exemplary feature vectors, each exemplary feature vector respectively representing occurrence counts of references in an exemplary document's text to each of the group of named entities. In some embodiments, the exemplary document is determined, based on the hierarchy of locations, to be associated with a relevant location to the particular location. In some embodiments, the computer program product may be further operable to cause data processing apparatus to apply a weighting scheme to improve performance of the location-specific classifier that is associated with the particular location.

In some embodiments, feature vector r is a vector of values with each element of feature vector r being an occurrence count of references within the document's text to one of the group of named entities, each element having an index position. In some embodiments, generating the feature vector r comprises for each named entity in the group of named entities, generating a reference bit vector for each reference within the document's text to the named entity, and calculating a sum vector from the generated reference bit vectors. In some embodiments, feature vector r of a dimensionality d that is equal to the size of the group of named entities, and wherein the reference bit vector for a named entity is a bit vector of dimensionality d with a value of 1 at the bit vector element index position corresponding to the feature vector r element index position representing the occurrence count of references to the named entity. In some embodiments, feature vector r is a vector of values of a fixed dimensionality d that is less than the size of the group of named entities, and wherein the reference bit vector for a named entity is a bit vector of dimensionality d with a value of 1 at each of k index positions, where k is greater than or equal to 2, and the k index positions are chosen at random to indicate the named entity.

BRIEF DESCRIPTION OF THE SEVERAL VIEWS OF THE DRAWING(S)

Having thus described embodiments of the invention in general terms, reference will now be made to the accompanying drawings, which are not necessarily drawn to scale, and wherein:

FIG. 4A is an example document that may be used as input in accordance with an example embodiment;

FIG. 4B is the example document after tokenization and entity reorganization in accordance with an example embodiment;

FIG. 5A is an example illustration of vector space V in accordance with an example embodiment;

FIG. 5B is an example illustration of vector space V with a fixed dimensionality in accordance with an example embodiment;

FIG. 6 is an example illustration of a weighted vector in accordance with an example embodiment;

Figure 10:
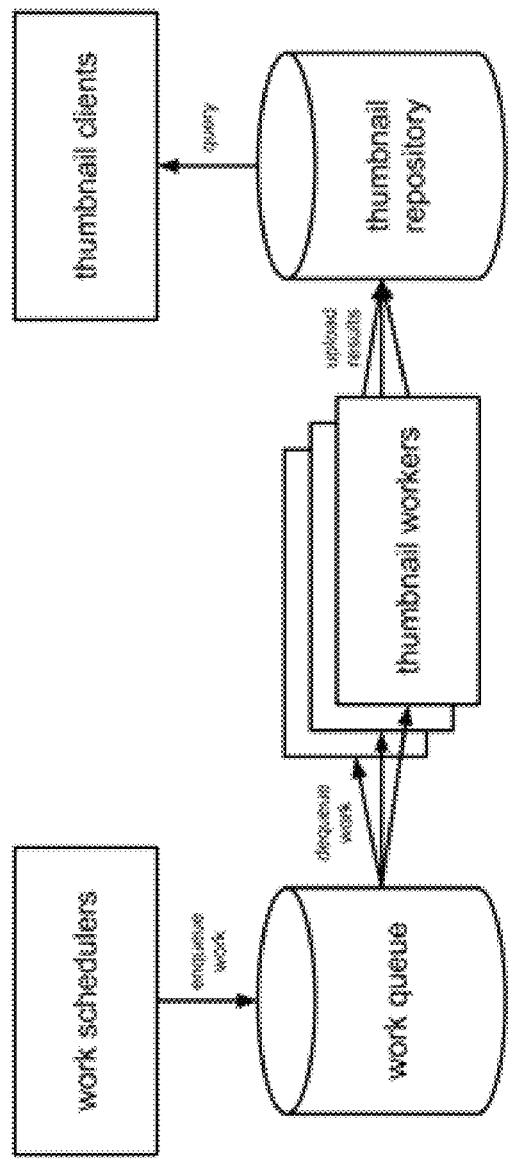
Figure 11:
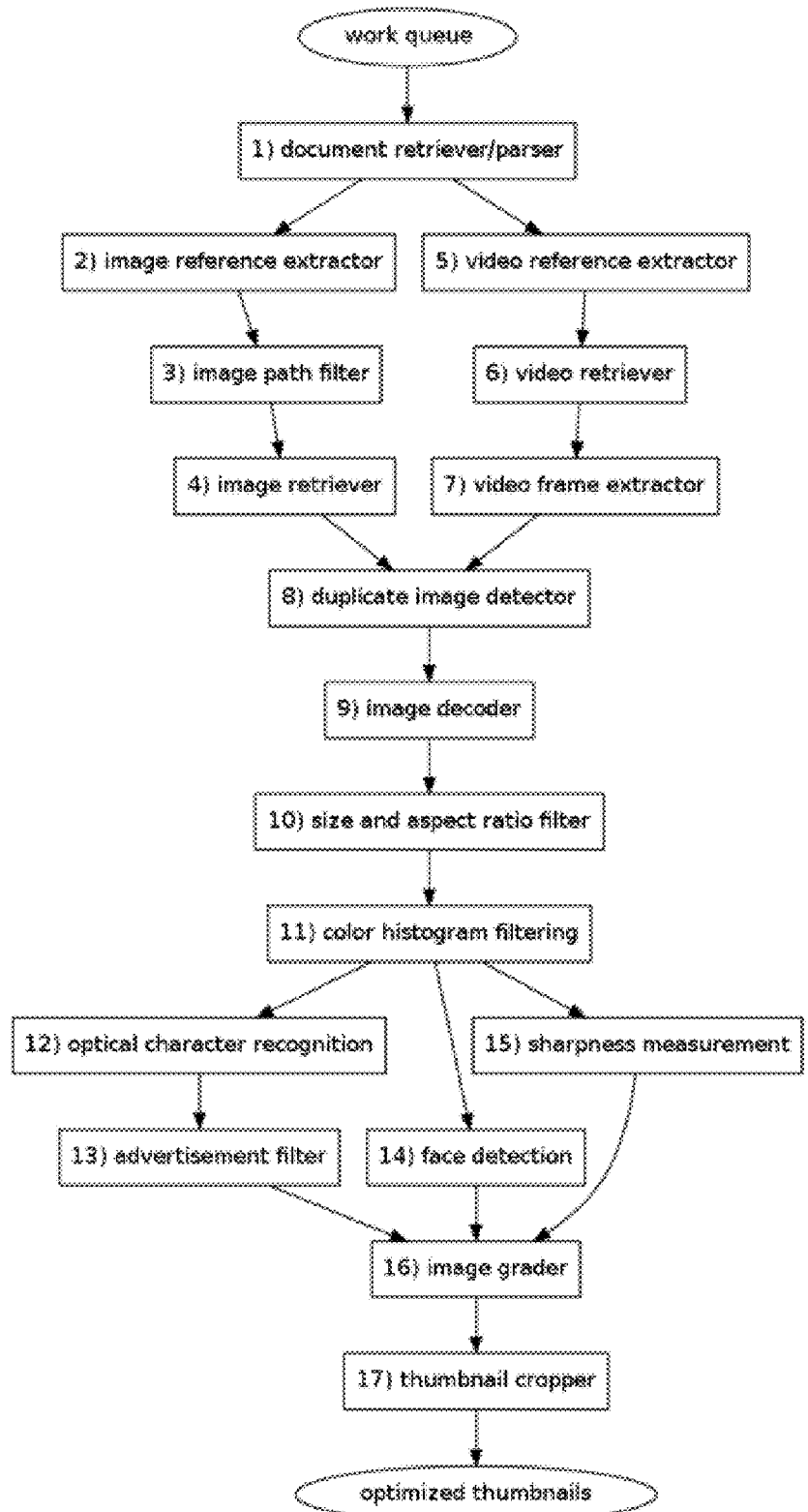

FIG. 10 is a block diagram of an apparatus that may be specifically configured to find high quality pictures or videos to represent the documents, and creates optimal thumbnails from these pictures and videos in accordance with an example embodiment of the present invention; and FIG. 11 is a flowchart illustrating an example method of the logical operation of the thumbnail workers in accordance with an example embodiment;

DETAILED DESCRIPTION

Embodiments of the present invention now will be described more fully hereinafter with reference to the accompanying drawings, in which some, but not all embodiments of the inventions are shown. Indeed, embodiments of the invention may be embodied in many different forms and should not be construed as limited to the embodiments set forth herein; rather, these embodiments are provided so that this disclosure will satisfy applicable legal requirements. Like numbers refer to like elements throughout.

As used herein, the terms "data," "content," "information" and similar terms may be used interchangeably to refer to data capable of being captured, transmitted, received, displayed and/or stored in accordance with various example embodiments. Thus, use of any such terms should not be taken to limit the spirit and scope of the disclosure. Further, where a computing device is described herein to receive data from another computing device, it will be appreciated that the data may be received directly from the another computing device or may be received indirectly via one or more intermediary computing devices, such as, for example, one or more servers, relays, routers, network access points, base stations, and/or the like, sometimes referred to herein as a "network." Similarly, where a computing device is described herein to send data to another computing device, it will be appreciated that the data may be sent directly to the another computing device or may be sent indirectly via one or more intermediary computing devices, such as, for example, one or more servers, relays, routers, network access points, base stations, and/or the like.

Brief Overview

The methods, apparatus and computer program products described herein are operable for the classification of documents using a location hierarchy. In some embodiments, a determination of a geographic area to which a particular document (e.g., a publication or the like) is relevant enables providing more relevant search results to users.

In some embodiments, a system, method, apparatus and computer program product may be provided for identifying local publications and documents and classifying the documents, by, for example, determining one or more geographical areas to which the documents may semantically relate. Determining the geographical area to which the document may be semantically related may allow a web crawler or the like to target an area of focus, yielding more qualified results and reducing the time required to crawl for relevant documents.

For example, in some embodiments, a system may access and tokenize a document to identify one or more entities referenced within the document, then determine, based on the relative frequency of references to each entity associated with a geographic location, whether a document is semantically related to a geographic location. In some embodiments, a feature vector representing an occurrence count of references to each entity associated with a geographic location and identified within a document's text may be constructed. The feature vector is input to at least one of a set of location-specific classifiers, each classifier respectively corresponding to one of a set of geographic locations and configured to output a positive response if an input feature vector represents at least one occurrence of a reference to an entity that is associated with the classifier's corresponding geographic location. The document is determined to be semantically related to a geographic location if the location-specific classifier corresponding to that geographic location generates a positive output in response to input of a feature vector representing entities identified in the document text.

In some embodiments, each of the set of location-specific classifiers is a trainable classifier that has been adapted based on a training data set of exemplary feature vectors representing exemplary documents previously determined to be semantically related to particular geographic locations.

Example System Architecture

Figure 1:
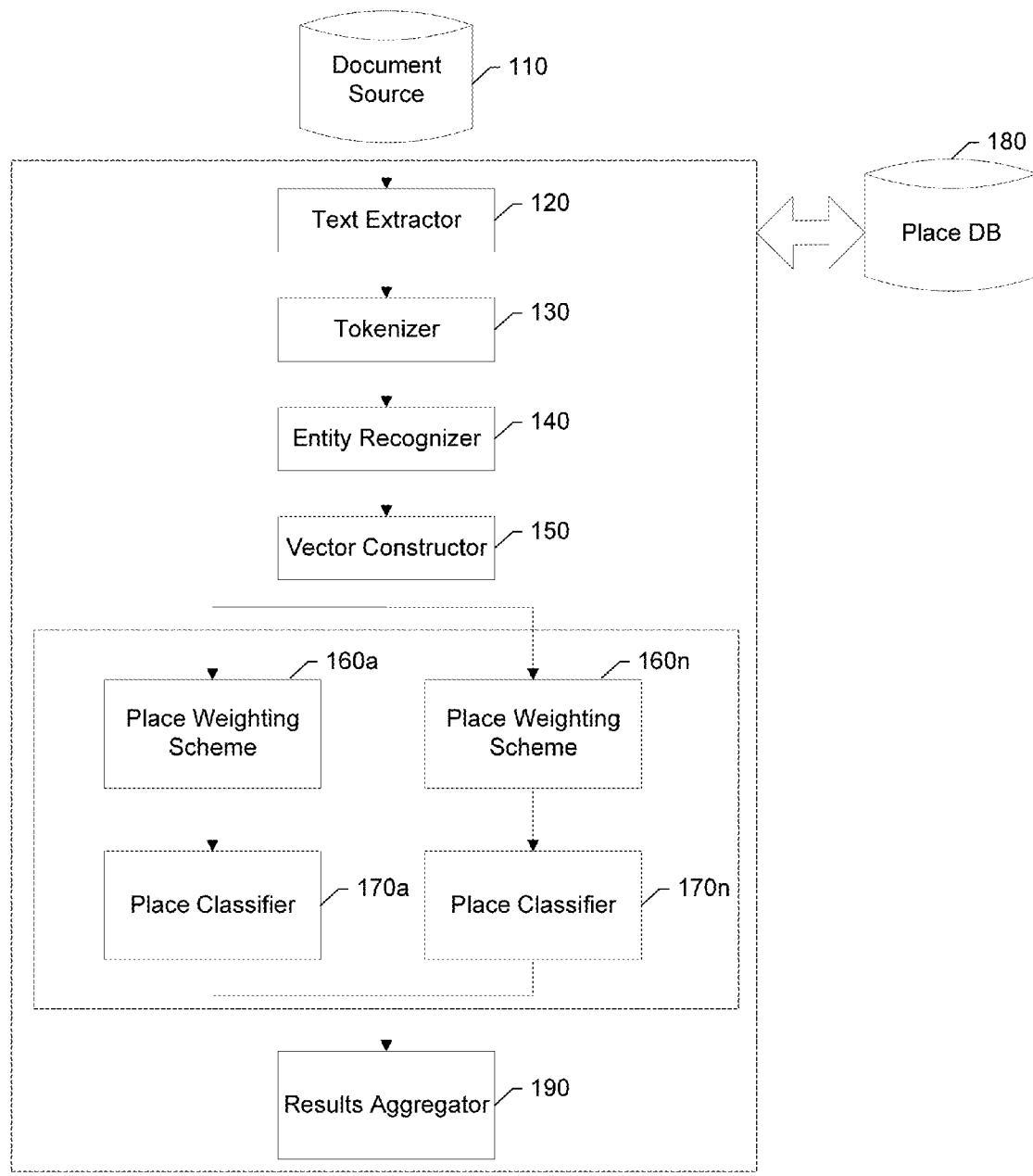
FIG. 1 is block diagram of a document classification system that is configured to extract text data and determine whether a document is associated with a particular location based on the text data, in accordance with an example embodiment.

FIG. 1 is a block diagram showing an exemplary document classification system 100 for determining whether a document is associated with (i.e., has a semantic relationship with) a particular geographic location using a set of location-specific place classifiers.

In embodiments, system 100 may be configured to include a text extractor 120, tokenizer 130, entity recognizer 140, vector constructor 150, one or more place weighting schemes 160a-160n, one or more location-specific place classifiers 170a-170n, and a result aggregator 190. In some embodiments system 100 may be configured to include one or more of a document source database for storing documents for determining to which location each document may related, and a place database 180 for storing data representing a set of locations. In some embodiments, the set of locations may be organized into a location hierarchy in which each location is more specific than its parent location.

In some embodiments, in addition to storing documents, the document source (or document database) 110 may be configured for storing information related to each stored document, for example a URL of a document, main text of a document, and/or annotations indicating the most specific place to which the document is semantically relevant, if known. In some embodiments, human curators may provide the annotations manually. Additionally and/or alternatively, in a web crawling context, a web crawler may load document information into the document database 110.

In embodiments, text extractor 120 may be configured for extracting text from one or more documents in the documents database 110. In one example embodiment, text extractor 120 may be configured for extracting the main text from a document or a document's source utilizing a third-party software program (e.g., jusText). In some alternative embodiments, as one of ordinary skill in the art would appreciate, other methods to extract the main text of a document may be used.

In embodiments, tokenizer 130 may be configured for identifying, separating, and/or breaking a document into words, phrases, symbols, and/or other meaningful elements. In embodiments, after the main text of a document is tokenized, entity recognizer 140 may be configured to include a named entity recognition process (e.g., the Stanford CoreNLP project) for extracting parts of the text which likely refer to named entities (e.g., people, places, and businesses).

In some embodiments, the annotations associated with stored documents may be used to train probabilistic binary classifiers (e.g., using logistic regression) for use in determining geographic locations to which unannotated documents are semantically relevant.

In some embodiments, vector constructor 150 may be configured for generating a document representation of document features using a vector space, where elements of a document's feature vector indicate occurrence counts of references to named entities in the document's text. In embodiments, computed vector representations of annotated documents may be used for both training the classifiers and classifying unannotated documents.

In some embodiments, a set of place classifiers 170a-170n may be configured to be queried in a recursive manner to determine the particular location to which a document is associated. In embodiments in which the locations are organized into a location hierarchy, the particular location corresponds to the most specific traversed place in the place hierarchy (and thereby to all the parents of that place). In embodiments, results aggregator 190 may be configured to generate a result including at least the most specific traversed place in the place hierarchy.

In some embodiments, the performance of each of the set of location-specific place classifiers 170a-170n may be improved by implementing a set of place weighting schemes 160a-160n. In some embodiments, different weights are used for each location-specific classifier, and the feature vector presented to each classifier is weighted according to the weighting scheme respectively associated with that classifier. Weighting schemes are described in more detail later in this application.

Classification and Tagging of Textual Data

Figure 2:
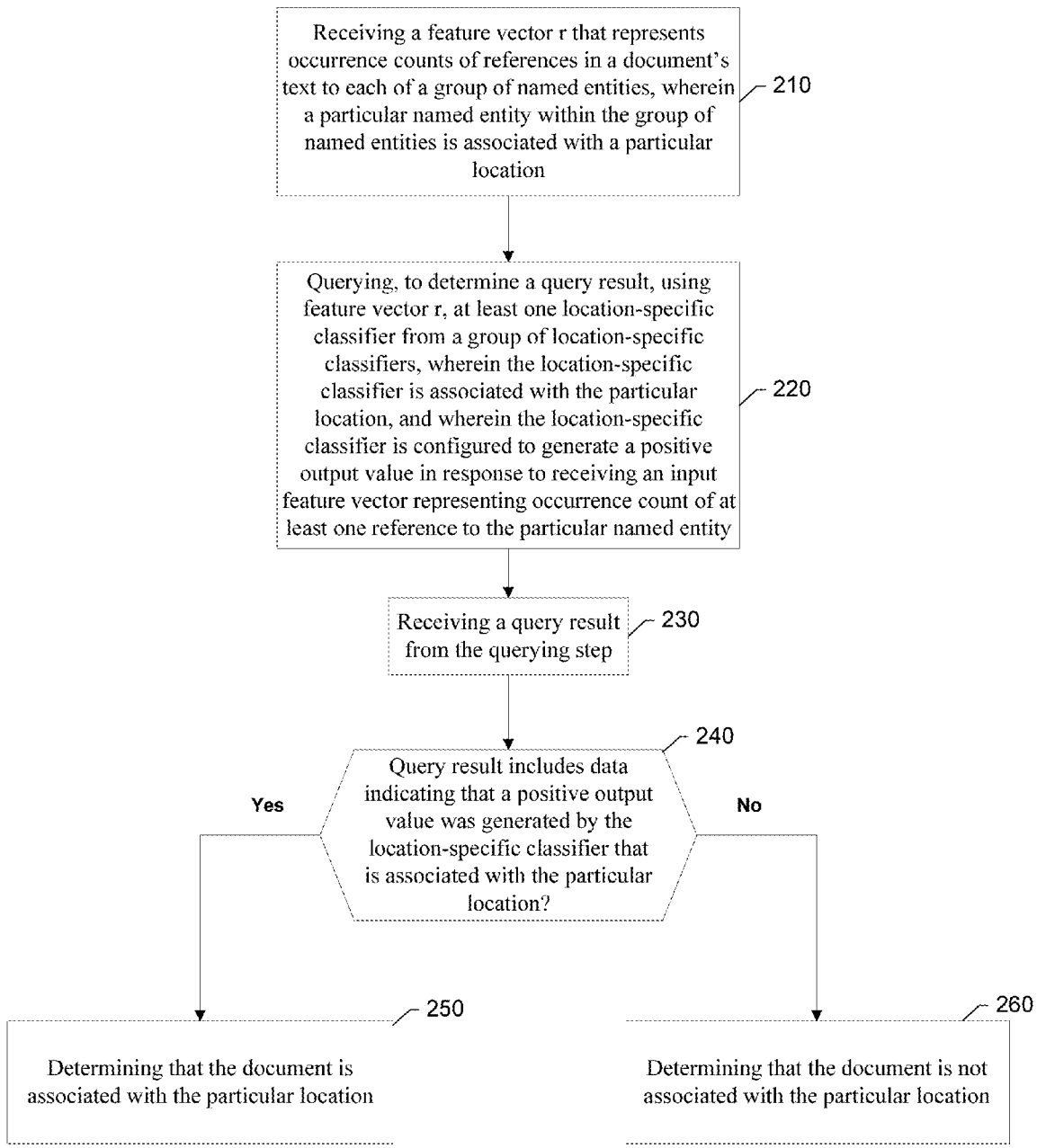
FIG. 2 is a flowchart illustrating a method for receiving a feature vector and determining whether a document is associated with a particular location according to the feature vector in accordance with an example embodiment.

FIG. 2 illustrates an example flowchart of the example operations performed by a method, apparatus and computer program product in accordance with an embodiment of the present invention. It will be understood that each block of the flowcharts, and combinations of blocks in the flowcharts, may be implemented by various means, such as hardware, firmware, processor, circuitry and/or other devices associated with execution of software including one or more computer program instructions.

Figure 7:
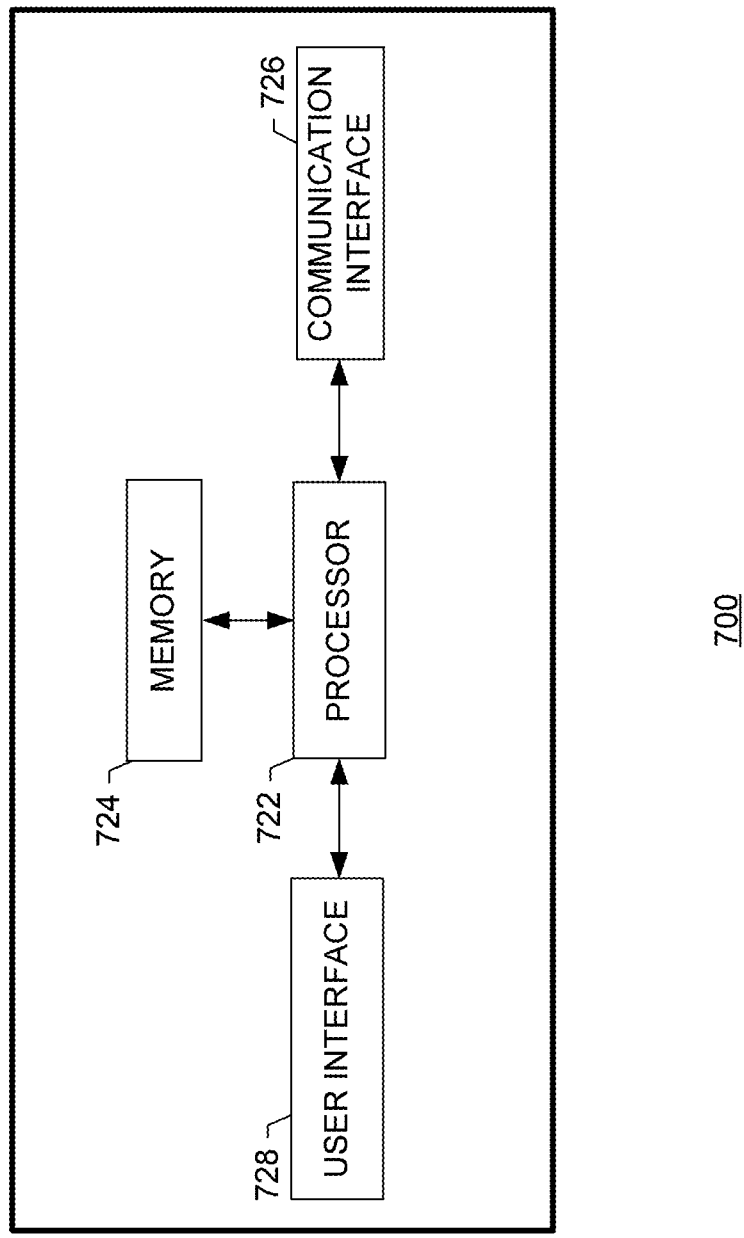
FIG. 7 is a block diagram of an apparatus that may be specifically configured in accordance with an example embodiment of the present invention.

For example, in reference to FIG. 7, one or more of the procedures described herein may be embodied by computer program instructions. In this regard, the computer program instructions which embody the procedures described above may be stored by a memory 724 of an apparatus employing an embodiment of the present invention and executed by a processor 722 in the apparatus.

As will be appreciated by one of ordinary skill in the art, any such computer program instructions may be loaded onto a computer or other programmable apparatus (e.g., hardware) to produce a machine, such that the resulting computer or other programmable apparatus provides for implementation of the functions specified in the flowcharts' block(s). These computer program instructions may also be stored in a non-transitory computer-readable storage memory that may direct a computer or other programmable apparatus to function in a particular manner, such that the instructions stored in the computer-readable storage memory produce an article of manufacture, the execution of which implements the function specified in the flowcharts' block(s). The computer program instructions may also be loaded onto a computer or other programmable apparatus to cause a series of operations to be performed on the computer or other programmable apparatus to produce a computer-implemented process such that the instructions which execute on the computer or other programmable apparatus provide operations for implementing the functions specified in the flowcharts' block(s). As such, the operations of FIG. 2 when executed, convert a computer or processing circuitry into a particular machine configured to perform an example embodiment of the present invention. Accordingly, the operations of FIG. 2 define an algorithm for configuring a computer or processing to perform an example embodiment. In some cases, a general purpose computer may be provided with an instance of the processor which performs the algorithms of FIG. 2 to transform the general purpose computer into a particular machine configured to perform an example embodiment.

Accordingly, blocks of the flowcharts support combinations of means for performing the specified functions and combinations of operations for performing the specified functions. It will also be understood that one or more blocks of the flowcharts, and combinations of blocks in the flowcharts, can be implemented by special purpose hardware-based computer systems which perform the specified functions, or combinations of special purpose hardware and computer instructions.

In some embodiments, certain ones of the operations herein may be modified or further amplified as described below. Moreover, in some embodiments additional optional operations may also be included. It should be appreciated that each of the modifications, optional additions or amplifications below may be included with the operations above either alone or in combination with any others among the features described herein.

High Level Process

FIG. 2 shows an example method that may be executed by one or more machines, such as, for example place classifiers 170a-170n and results aggregator 190 included in document classification system 100 of FIG. 1, for determining whether a document is associated with a particular location, in accordance with some embodiments discussed herein.

As shown in block 210 of FIG. 2, an apparatus, such as document classification apparatus 100, may be configured for receiving a feature vector that represents occurrence counts of references in a document's text to each of a group of named entities. In some embodiments, the feature vector is constructed as previously described with reference to FIG. 1. In some embodiments, at least one named entity within the group of named entities is associated with a particular location.

As shown in block 220 of FIG. 2, the apparatus may be configured for querying a set of location-specific place classifiers 170a-170n using the feature vector to determine whether a document is associated with a particular location. In some embodiments, the performance of each of the set of location-specific place classifiers 170a-170n may be improved by implementing a set of place weighting schemes 160a-160n, as described with reference to FIG. 1. In some embodiments, the determination may be performed using a querying step and determination step. In some embodiments, the particular location is within a set of locations that are organized into a location hierarchy.

Figures 3A, 3B:
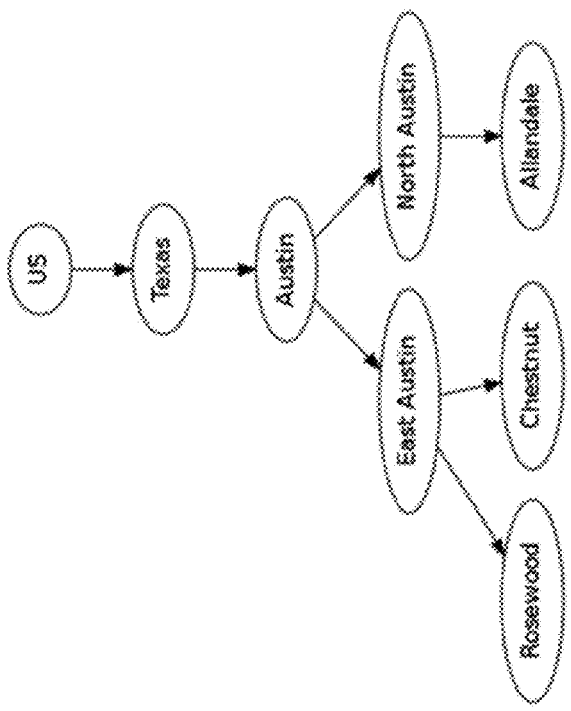
FIG. 3A is a graphical representation of a location hierarchy in accordance with an example embodiment.
FIG. 3B is a data representation of the location hierarchy that may be used by, for example, a SQL database to store the data in accordance with an example embodiment.

FIG. 3A is a graphical representation of an exemplary location hierarchy in which each location is more specific than its parent location. FIG. 3B is a data representation of the exemplary location hierarchy that may be stored in a SQL place database 180.

In some embodiments, a set of location-specific place classifiers 170a-170n may be configured to be queried in a recursive manner. Referring to the exemplary place hierarchy illustrated in FIG. 3A, a classifier that is associated with the least specific location (e.g., US) may be queried first. If the US classifier reports a positive result (e.g., indicating that the document is relevant to the US), the classifiers for each of the location's children in the hierarchy may then be queried. This process may be repeated recursively. For example, if the Austin classifier reports a positive result for a document, then the North Austin and East Austin classifiers are each queried with the document. If the North Austin classifier then reports a positive result, the Rosewood and Chestnut classifiers are queried with the document. If multiple sibling classifiers report a positive result for a document, traversal proceeds to the subtree corresponding to the classifier which reports the highest confidence. If none of the sibling classifiers at a certain level of the hierarchy report a positive result, traversal stops.

In some embodiments, results aggregator 190 generates data describing the set of locations traversed in the place hierarchy. In some embodiments, a search result is generated that includes data indicating the most specific traversed location in the place hierarchy (i.e., the most specific location for which its location-specific classifier generated a positive result).

As shown in block 230 of FIG. 2, the apparatus may be configured to receive the query result from the querying step. The apparatus determines, in block 240, whether the particular location matches the most specific location included in the query result. As is shown in block 250, the document is determined to be associated with the particular location if the particular location matches the specific location indicated in the query result. As is shown in block 260, the document is determined to not be associated with the particular location if the particular location does not match the specific location indicated in the query result.

Generating the Feature Vector

FIGS. 4A and 4B respectively show example text input (e.g., from a document) and an example output of the tokenizer 130 and entity recognizer 140 applied to that text input. The output indicates which parts of the text are likely named entity references, and the type of each reference. In some embodiments, a feature vector may then be constructed from this output by defining a vector space in which each dimension corresponds to a particular named entity that is referenced in the text.

FIG. 5A illustrates the elements of an exemplary 6 dimensional vector space in which each element corresponds to one of the named entities identified in FIG. 4B. In some embodiments, the vector space V may have dimension equal to the number of distinct named entity references that are identified in the document. So with V defined thus, the above example document could be represented as a vector in V by [1, 2, 1, 1, 1, 0]. This can be thought of as constructing an entity vector for each entity (e.g. for Austin, [1, 0, 0, 0, 0, 0], for SWAT, [0, 0, 1, 0, 0, 0]) and adding together the entity vectors for each entity reference in the document.

In some embodiments, the dimensionality of V may be reduced by ignoring some of the named entity references (e.g., in the example, the entity "Manor Road" identified in the output of FIG. 4B is ignored) to avoid scaling issues if a large number of named entities are referenced in the document and the vector space V dimensionality is kept equal to the number of identified named entities.

Additionally and/or alternatively, in some embodiments, dimensionality reduction techniques may be used to minimize the dimensionality of V without ignoring named entity references. For example, using random indexing, a fixed dimensionality may be chosen for V, and a random vector in V is chosen for each distinct named entity reference, e.g., V may have dimension D=10 and vectors may be chosen for each distinct named entity reference by choosing at random k=2 dimensions of the 10 and constructing a vector with 1 in these dimensions, and 0 elsewhere. If D is made large enough (e.g., 2000) and k is small enough (e.g., 10), then any two such randomly constructed vectors will be orthogonal with high probability.

FIG. 5B illustrates an example of six bit vectors, each bit vector encoded according to the example random encoding scheme described above. A document may then be represented by the sum of the randomly chosen entity vectors for each entity reference found in the document. Continuing the example from above, the document could then be represented as the vector:
[1 0 0 1 0 0 0 0 0 0]+2*[0 1 0 0 0 0 1 0 0 0]+[1 0 0 0 0 1 0 0 0 0]+[1 0 0 0 0 0 1 0 0 0]+[0 0 0 1 0 0 0 0 0 1]=[3 2 0 2 0 1 3 0 0 1]
thus allowing use of a fixed dimensionality for V without ignoring some entity references.

Training

In some embodiments, each of the group of location-specific place classifiers 170a-170n is a trainable classifier that is adapted using supervised learning. In some embodiments, a separate binary classifier may be trained for each place in the place database 180. Specifically, in some embodiments, positive examples for each classifier may be sampled from those documents annotated as relevant to the place associated with the classifier, including more specific places, and in some embodiments, negative examples may be sampled from those documents annotated as relevant to the parent of the classifier's place but not relevant to the classifier's place. In reference to the exemplary location hierarchy represented in FIGS. 3A and 3B, when training a classifier for Austin, positive examples may be sampled from the documents annotated as relevant to Austin, East Austin, North Austin, Allandale, etc., and negative examples may be sampled from the documents annotated as relevant to Texas but not Austin (including Houston, Dallas, etc.).

Subsequently, when training a classifier for North Austin, positive examples may be sampled from the documents annotated as relevant to North Austin, Allandale, etc., and negative examples may be sampled from those documents relevant to Austin but not North Austin (including East Austin, etc.).

Weighting

In some embodiments, weighting schemes 160a-160n may be used to improve classification, increasing the weight of features useful for classification and decreasing the weight of features not useful for classification. In some embodiments, a weighting scheme, such as Delta TFIDF, may be utilized, although those with ordinary skill in the art will recognize that the choice of weighting scheme is not critical to the invention.

Delta TFIDF assigns a weight to each feature (in this case, each entity reference), as follows:
|P|=number of positive examples
$|\underline{P_e}|$=number of positive examples containing a reference to entity e
|N|=number of negative examples
$|N_e|$=number of negative examples containing a reference to entity e
$W_{e,d}$=weight for entity e in document d.
=$\underline{\log_1}(|\underline{P_e}|/|P|)-\log_2(|N|/|N_e|)$
Delta TFIDF thus assigns a higher weight to those entities which occur more often in the positive examples than in the negative examples, a lower weight to those entities which occur more often in the negative examples than the positive examples, and a weight close to zero to those entities which occur equally often in the positive and negative examples. Note that the weights are different for each classifier, since each classifier has a different set of positive and negative examples, as described above.

To construct a weighted vector for a document d, the entity vectors for each entity e referenced in the document d may be multiplied by the associated weight $W_{e,d}$, then added together as above.

FIG. 6 illustrates a set of exemplary weights calculated using Delta TFIDF and assigned to each of the locations referenced in FIG. 4B for an exemplary location-specific classifier associated with Austin. Thus, a vector for the example document referenced in FIG. 4A may be constructed for the Austin classifier, using the exemplary random entity vectors in FIG. 5B, as:
2.322*[1 0 0 1 0 0 0 0 0 0]+2*1.585*[0 1 0 0 0 0 1 0 0 0]+−0.5850*[1 0 0 0 0 1 0 0 0 0]+1.2016*[1 0 0 0 0 0 1 0 0 0]+−0.01291*[0 0 0 1 0 0 0 0 0 1]=[2.939 3.170 0.0 2.309 0−0.5850 4.372 0 0−0.01291]

In some embodiments, the same weighting scheme may be applied to vectors used for training a location-based classifier and for classification using that classifier.

As will be appreciated, any such computer program instructions and/or other type of code may be loaded onto a computer, processor or other programmable apparatus's circuitry to produce a machine, such that the computer, processor other programmable circuitry that execute the code on the machine create the means for implementing various functions, including those described herein.

As described above and as will be appreciated based on this disclosure, embodiments of the present invention may be configured as methods, mobile devices, backend network devices, and the like. Accordingly, embodiments may comprise various means including entirely of hardware or any combination of software and hardware. Furthermore, embodiments may take the form of a computer program product on at least one non-transitory computer-readable storage medium having computer-readable program instructions (e.g., computer software) embodied in the storage medium. Any suitable computer-readable storage medium may be utilized including non-transitory hard disks, CD-ROMs, flash memory, optical storage devices, or magnetic storage devices.

Embodiments of the present invention have been described above with reference to block diagrams and flowchart illustrations of methods, apparatuses, systems and computer program products. It will be understood that each block of the circuit diagrams and process flowcharts, and combinations of blocks in the circuit diagrams and process flowcharts, respectively, can be implemented by various means including computer program instructions. These computer program instructions may be loaded onto a general purpose computer, special purpose computer, or other programmable data processing apparatus to produce a machine, such that the computer program product includes the instructions which execute on the computer or other programmable data processing apparatus create a means for implementing the functions specified in the flowchart block or blocks.

These computer program instructions may also be stored in a computer-readable storage device that can direct a computer or other programmable data processing apparatus to function in a particular manner, such that the instructions stored in the computer-readable storage device produce an article of manufacture including computer-readable instructions for implementing the function discussed herein. The computer program instructions may also be loaded onto a computer or other programmable data processing apparatus to cause a series of operational steps to be performed on the computer or other programmable apparatus to produce a computer-implemented process such that the instructions that execute on the computer or other programmable apparatus provide steps for implementing the functions discussed herein.

Accordingly, blocks of the block diagrams and flowchart illustrations support combinations of means for performing the specified functions, combinations of steps for performing the specified functions and program instruction means for performing the specified functions. It will also be understood that each block of the circuit diagrams and process flowcharts, and combinations of blocks in the circuit diagrams and process flowcharts, can be implemented by special purpose hardware-based computer systems that perform the specified functions or steps, or combinations of special purpose hardware and computer instructions.

Computing Device Architecture

In some embodiments of the present invention, an apparatus, such as a classification system 100, text extractor 120, tokenizer, 130, entity recognizer 140, vector constructor 150, one or more place weighting schemes 160a-160n, one or more place classifiers 170a-170n, and result aggregator 190 may be embodied by a computing device. The computing device may include or be associated with an apparatus 700 as shown in FIG. 7. In this regard, the apparatus may include or otherwise be in communication with a processor 722, a memory device 724, a communication interface 726 and a user interface 728. As such, in some embodiments, although devices or elements are shown as being in communication with each other, hereinafter such devices or elements should be considered to be capable of being embodied within the same device or element and thus, devices or elements shown in communication should be understood to alternatively be portions of the same device or element.

In some embodiments, the processor 722 (and/or co-processors or any other processing circuitry assisting or otherwise associated with the processor) may be in communication with the memory device 724 via a bus for passing information among components of the apparatus. The memory device may include, for example, one or more volatile and/or non-volatile memories. In other words, for example, the memory device may be an electronic storage device (e.g., a computer readable storage medium) comprising gates configured to store data (e.g., bits) that may be retrievable by a machine (e.g., a computing device like the processor). The memory device may be configured to store information, data, content, applications, instructions, or the like for enabling the apparatus 1500 to carry out various functions in accordance with an example embodiment of the present invention. For example, the memory device could be configured to buffer input data for processing by the processor. Additionally or alternatively, the memory device could be configured to store instructions for execution by the processor.

As noted above, the apparatus 500 may be embodied by the classification and tagging apparatus 100 configured to employ an example embodiment of the present invention. However, in some embodiments, the apparatus may be embodied as a chip or chip set. In other words, the apparatus may comprise one or more physical packages (e.g., chips) including materials, components and/or wires on a structural assembly (e.g., a baseboard). The structural assembly may provide physical strength, conservation of size, and/or limitation of electrical interaction for component circuitry included thereon. The apparatus may therefore, in some cases, be configured to implement an embodiment of the present invention on a single chip or as a single "system on a chip." As such, in some cases, a chip or chipset may constitute means for performing one or more operations for providing the functionalities described herein.

The processor 722 may be embodied in a number of different ways. For example, the processor may be embodied as one or more of various hardware processing means such as a coprocessor, a microprocessor, a controller, a digital signal processor (DSP), a processing element with or without an accompanying DSP, or various other processing circuitry including integrated circuits such as, for example, an ASIC (application specific integrated circuit), an FPGA (field programmable gate array), a microcontroller unit (MCU), a hardware accelerator, a special-purpose computer chip, or the like. As such, in some embodiments, the processor may include one or more processing cores configured to perform independently. A multi-core processor may enable multiprocessing within a single physical package. Additionally or alternatively, the processor may include one or more processors configured in tandem via the bus to enable independent execution of instructions, pipelining and/or multithreading.

In an example embodiment, the processor 722 may be configured to execute instructions stored in the memory device 724 or otherwise accessible to the processor. Alternatively or additionally, the processor may be configured to execute hard coded functionality. As such, whether configured by hardware or software methods, or by a combination thereof, the processor may represent an entity (e.g., physically embodied in circuitry) capable of performing operations according to an embodiment of the present invention while configured accordingly. Thus, for example, when the processor is embodied as an ASIC, FPGA or the like, the processor may be specifically configured hardware for conducting the operations described herein. Alternatively, as another example, when the processor is embodied as an executor of software instructions, the instructions may specifically configure the processor to perform the algorithms and/or operations described herein when the instructions are executed. However, in some cases, the processor may be a processor of a specific device (e.g., a head mounted display) configured to employ an embodiment of the present invention by further configuration of the processor by instructions for performing the algorithms and/or operations described herein. The processor may include, among other things, a clock, an arithmetic logic unit (ALU) and logic gates configured to support operation of the processor. In one embodiment, the processor may also include user interface circuitry configured to control at least some functions of one or more elements of the user interface 728.

Meanwhile, the communication interface 726 may be any means such as a device or circuitry embodied in either hardware or a combination of hardware and software that is configured to receive and/or transmit data between the computing device 10 and a server 12. In this regard, the communication interface 726 may include, for example, an antenna (or multiple antennas) and supporting hardware and/or software for enabling communications wirelessly. Additionally or alternatively, the communication interface may include the circuitry for interacting with the antenna(s) to cause transmission of signals via the antenna(s) or to handle receipt of signals received via the antenna(s). For example, the communications interface may be configured to communicate wirelessly with the head mounted displays 10, such as via Wi-Fi, Bluetooth or other wireless communications techniques. In some instances, the communication interface may alternatively or also support wired communication. As such, for example, the communication interface may include a communication modem and/or other hardware/software for supporting communication via cable, digital subscriber line (DSL), universal serial bus (USB) or other mechanisms. For example, the communication interface may be configured to communicate via wired communication with other components of the computing device.

The user interface 728 may be in communication with the processor 722, such as the user interface circuitry, to receive an indication of a user input and/or to provide an audible, visual, mechanical, or other output to a user. As such, the user interface may include, for example, a keyboard, a mouse, a joystick, a display, a touch screen display, a microphone, a speaker, and/or other input/output mechanisms. In some embodiments, a display may refer to display on a screen, on a wall, on glasses (e.g., near-eye-display), in the air, etc. The user interface may also be in communication with the memory 724 and/or the communication interface 726, such as via a bus.

Flexible High-Speed Indexing and Retrieval of Geolocated Content

A search index system receives descriptions of documents to be indexed and builds indices which allow the system to quickly return results for search queries. Technologies upon which search index systems are based often include various query capabilities, such as ranking documents based on their textual similarity to a user-provided textual query, or sorting documents by their publication date, or sorting by the distance from a geographical query point to one or more of the locations associated with a document. There are also functions made to filter documents based on inclusion of a certain textual phrase, having a publication date within a certain range, or having a location within a certain geographic area. Often, an ad hoc query language is provided, by which developers building a search index system can construct novel types of queries expressed as mathematical functions operating on properties of the documents.

Three common types of geo queries supported by existing search index systems are point-radius, bounding box, and polygon. For a point-radius query, a single center point is given and all documents within a specified distance of that area are retrieved. For a bounding box query, an upper and lower latitude and a left and right longitude are given, and all documents within the bounds are retrieved. For a polygon query, a set of points are given which define a polygon, and all documents within the polygon are retrieved. Previous methods of implementing these queries have a few flaws with them. Point-radius queries involve an expensive calculation of distance between each document's locations and the center point. Bounding box can be made quick by indexing the latitude and longitude of each document's locations, but this index lookup fails for certain cases of documents with more than one location. For example, a document with locations in both Berkeley and Downtown San Francisco would show up on a query for Alameda Island [FIG. 8]. Polygon queries involve an expensive computation of whether or not any of each document's locations fall within the given polygon.

Figure 8:
FIG. 8 is a geographical representation of an embodiment related to flexible high-speed indexing and retrieval of geolocated content.

FIG. 8 comprises the following additional location point information:
37.785639, −122.285042—Alameda
37.870517, −122.278862—Berkeley
37.786182, −122.423058—Downtown San Francisco
37.785<lat<37.787
−122.29<lon<−122.27

In the case of a static set of geo areas, such as a few static point-radius pairs representing cities, or a set of polygons representing congressional districts, these expensive inclusion or distance computations can be done when the document is indexed, and the precomputed results used for retrieving the documents later. However, such methods are not efficient when the spatial query point (the user's location) takes on many unique values. Such methods also perform poorly because the spatial distance calculations must be performed for every document in the queryset.

When serving geolocated content to users with a known location, it is generally desirable to show documents located closer to the user's location before documents located further from the user's location, all other things being equal. It is also desirable to return good results quickly rather than perfect results slowly because in the common case, only the items close to the user will be displayed, and responsiveness of a system affects user perception of the system.

Embodiments disclosed herein provide a new system, method, and computer program product for flexible, high-speed indexing and retrieval of geolocated documents.

In order to avoid the problem caused by multiple points, both latitude and longitude are indexed together in one value by dividing the area of the earth into discrete subdivisions, and then indexing a document by what subdivisions it fits into. One such example method is Geohash, which is a hierarchical spatial data structure in the public domain which subdivides space into buckets of grid shape. When a document is indexed, it is given a term corresponding to each geohash box that it fits into. For example, if the document was associated with the coordinate pair 57.64911, 10.40744 (near the tip of the peninsula of Jutland, in Denmark) it would produce a hash of u4pruydqqvj, and it would be indexed with the terms "u", "u4", "u4p", "u4pr", "u4pruy", "u4pruyd", "u4pruydq", "u4pruydqq", "u4pruydqqv", "u4pruydqqvj". Then, if all documents in the Geohash grid cell were queried with a "u", the document would be retrieved, or if all documents in grid cell were queried with a "u4", the document would be retrieved, or if all documents in grid cell were queried with a "u4p" the document would be retrieved, and so on.

Figure 9:
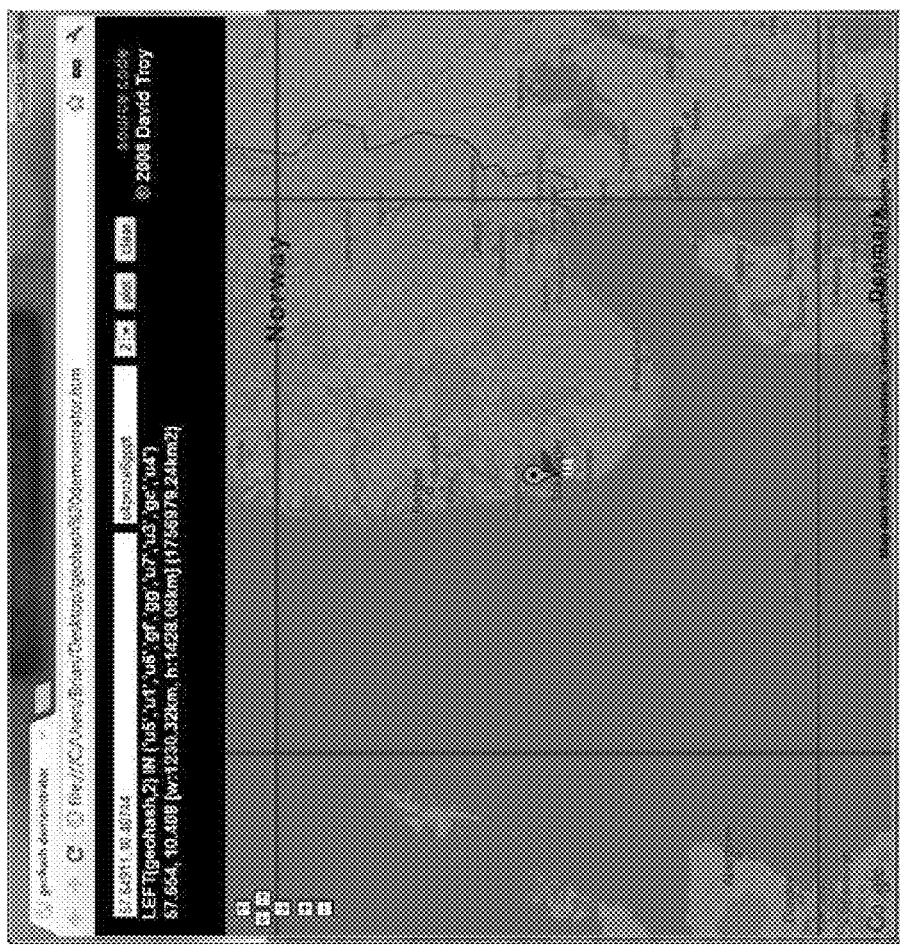
FIG. 9 is a geographical representation of an embodiment related to flexible high-speed indexing and retrieval of geolocated content.

However, by dividing the world discretely using geohash and indexing documents using that geohash, the ability to express a query with a single definition of an area is lost. For example, if a user wanted to retrieve all items within a 25 km radius of 57.64911, 10.40744, using a single geohash to approximate this area would result in using the "u4" geohash bucket (the smallest single bucket which completely contains the area), which covers half of Denmark a significant part of Norway [FIG. 9], as compared to the approximately 2000 km^2 of the requested point radius. In order to effectively use this indexing system and limit the overcount of area introduced by using geohash, the following algorithm illustrates a computer implementable method for finding a set of geohashes that closely estimate any of the common geo area forms.

If the area type is point-radius, approximate it with an n-sided regular polygon circumscribed around the circle of the point radius (a of the polygon=r of the circle) Higher values of n give a closer approximation of the area.

If the area is a bounding box, transform it into a quadrilateral polygon.

For any given polygon, run the following steps:

First, for the given polygon, find the longest prefix match of all of its points. This gives you the smallest single geohash prefix that completely encloses the polygon.

Second, if the given polygon is a quadrilateral and fits a geohash box exactly, return that geohash box as the approximation for this polygon, and mark it as an 'inner' geohash Third, if the difference between the area of this polygon and the area of its geohash is less than max_diff, use this geohash as the approximation for the polygon, and mark it as an 'outer' geohash. Max_diff>0, setting to lower values decreases the area overcount caused by geohash approximation Fourth, otherwise, split the polygon into two new polygons by subdividing along the next smaller geohash lines (increasing the length of the longest prefix of each of the created polygons by at least one). Conceptually, you split the polygon into 2 parts along a geohash line Steps 1-5 may be repeated for the subpolygons to create two estimation sets.

The estimation of this polygon is the union of the estimation sets of its subpolygons.

Look up all items in the index associated with any geohash in the estimation set to retrieve items located within the requested geo area.

If a level of accuracy equal to the prior geo area filters is needed, only the documents matching the 'outer' geohashes need to be checked for inclusion, since the inner geohashes are all completely enclosed by the requested geo area.

System, Method, and Computer Program Product for Creating Optimal Thumbnails for Web Documents Social media and Internet technologies have enabled any computer user, local organization or small business to easily publish content online. Blogging, Twitter and Facebook have become the main channels for user content publication. Local organizations, libraries and local businesses have transitioned their communications from physical media: newspapers, physical bulletin boards, fliers and Yellow Pages to informational websites and more recently social media outlets to attempt to connect with their audiences.

Many online documents may contain one, or more than one, photo or video, some of which may be representative of the document as a whole. However, it can be difficult to determine if a these are high quality, as many may be advertisements, about a related piece of content (instead of the intended document), or unrelated to the article.

Given those constraints, it is very difficult to find the right photo or image to represent a document, particularly with no human curation and at high speeds.

Current solutions to this problem are subpar. Most applications (that use photos to represent a document) use a human editor to pick the image. Others, who are more automated, have a high error rate or are too slow to operate at high speeds. Most applications simply do not have the skill necessary to solve the problem, which requires work in computer vision, an emerging field that requires specialized knowledge. As described herein one solution may, in some example embodiments, process webpages or other internet documents, to identify high quality pictures or videos to represent the documents, and creates optimal thumbnails from these pictures and videos.

One example embodiment, depicted in FIG. 10, consists of work schedulers which enqueue work items into a work queue. Each work item contains a locator such as a URL which can be used to retrieve a web document using an HTTP client. In one example, human curators may input URLs into a web application using a web browser, and work schedulers may then enqueue these URLs into the work queue. In another example, a separate web crawling system may enqueue work items for each crawled URL. Given a work queue with work items containing URLs, thumbnail workers dequeue work items from the work queue, apply processing steps described in detail below, and store the results, including the actual thumbnails produced, in a thumbnail repository. This repository can then be queried by thumbnail clients (also beyond the scope of this disclosure) which provide a URL and receive thumbnail results for that URL, including the actual thumbnails produced or URLs which locate these thumbnails.

One example of the logical operation of the thumbnail workers is depicted in FIG. 11 (each step of FIG. 11, may be optional or may be performed in an alternate order, in some example embodiments). In step 1, a web document is retrieved using the URL contained in the dequeued work item, and then parsed using a standard XML or HTML parser.

In step 2, image references are extracted from the parsed markup, in the simplest example by finding 'img' tags with 'src' attributes, the values of which are (possibly relative) URLs locating images. In step 3, these URLs are filtered using a manually constructed blacklist of regular expressions (regexes) designed to match the URLs of images very likely to be advertisements, icons, too small, etc. This allows avoiding downloading images which are not likely to be useful. For example, the regular expression '/favicon.ico$/' might be used to detect icons, the matching URLs discarded and not further processed, since these icons are too small to make good thumbnails at some desired sizes. In step 4, the images which do not match any of the blacklist regexes are retrieved using an HTTP client.

In step 5, video references are extracted from the parsed markup, in the simplest example by finding 'video' tags containing 'source' tags with 'src' attributes, or 'embed' tags with 'src' attributes, or 'object' tags with 'data' attributes, the values of which are (possibly relative) URLs locating videos. In step 6, these videos are retrieved using an HTTP client. If desired, the video retriever may stop retrieval of a video after receiving an initial segment of a desired minimum size. In step 7, the retrieved videos are decoded, if possible, and image frames from the videos are extracted, from desired points in the video (e.g. one frame every second from the first 15 seconds of the video).

The images from steps 4 and 7 for each document are considered as candidates for thumbnail creation. First, some heuristics are used to discard images which will not make good thumbnails.

In step 8, duplicate images may be detected. This can be accomplished, for example, by storing, for each image processed, a cryptographic hash of the image's binary data. When an image is processed, its hash can be computed and compared to previously computed hashes. If a match is found, the image may be excluded from further processing if it is desired that the created thumbnails be unique. In some examples, the methods described herein are configured to compute the hash of an image's data, store it, and check for matches to previously stored hashes.

In step 9, the remaining images are decoded. Having decoded an image, the size and aspect ratio of images is considered in step 10. Depending on the desired thumbnail sizes and aspect ratios, images of certain sizes and aspect ratios may be discarded. For example, images which have a width or height less than 100px may be ruled too small to be useful and discarded, and images which have aspect ratios wider than 3:1 or taller than 1:3 may be discarded as too much of the image would have to be cropped to create a thumbnail for some desired sizes.

In step 11, the color histogram of the decoded image may be computed, by counting the number of pixels of each color in the image. If more than a desired fraction of the pixels are of a single color, e.g. if more than ½ of the pixels are black, the image may be discarded.

In step 12, an optical character recognition (OCR) process is run on the decoded image, returning the text found in the image.

In step 13, a standard text classification process (such as Naive Bayes, Linear Discriminant Analysis, or a support vector machine) is run on the text found in step 12 to determine if the image is an advertisement. A collection of images labelled "advertisement"/"not advertisement" is manually assembled beforehand and the classifier trained using these examples. When processing an image the classifier is provided the text found by OCR and returns either "advertisement" or "not advertisement". If the classifier returns "advertisement" for an image, it is discarded.

In step 14, a face detection process (such as a cascade classifier using Haar-like features, available in the open source software package OpenCV) is run on the decoded image.

In step 15, the sharpness of the decoded image is measured. First, edge detection is performed by convolving the image with a convolution filter such as [[−1, −1, −1], [−1, 8, −1], [−1, −1, −1]]. The resulting pixel values are thresholded at a manually chosen value, resulting in a partition of the original image pixels into "edge" and "non-edge" pixels. The ratio of the number of "edge" pixels to the number of "non-edge" pixels is computed. The image may be discarded if this ratio lies outside manually chosen bounds, eliminating images with excessive edges (like dithered images) or with too few images (like simple gradient images). Otherwise, the image is blurred, for example using a standard Gaussian blur. The above edge detection process is run again on the blurred image, giving a blurred "edge"/"non-edge" ratio. The ratio of the original "edge"/"non-edge" ratio to the blurred ratio is taken as a measurement of the sharpness of the image.

In step 16, the discovered features of the remaining images for a document are scored and aggregated, giving an overall score for each image. For example, the sharpness of the image, measured in step 15 may be multiplied by one plus the number of faces detected in the image in step 14, giving the image's score. The image with the highest score for a document is chosen to represent the document.

In step 17, the chosen image is cropped to desired sizes and encoded with desired compression settings, which both may vary depending on the environment in which the thumbnails will be used (e.g. desktop or mobile).

System and Method for Ranking Web Content Based on Local Interest

Social media and Internet technologies have enabled any computer user, local organization or small business to easily publish content online. Blogging, Twitter and Facebook have become the main channels for user content publication. Local organizations, libraries and local businesses have transitioned their communications from physical media: newspapers, physical bulletin boards, fliers and Yellow Pages to informational websites and more recently social media outlets to attempt to connect with their audiences.

As such, there is a large amount of local information on the internet. The types of documents differ, including social media, structured APIs with geolocation data, and completely unstructured webpages. However, most of the information is not local in nature. The challenge is to identify the key local documents, across from different sources, determine their relevancy to an individual user, and display them in an aesthetically pleasing way.

Complicating the problem, with many types of local documents, like crime reports, blogs, news articles, restaurant info, events, and more, the user does not know the relevant search terms, and finding them might take excessive experimentation. To provide users with the local information they want, it is important to rank, organize and present the local information on the internet, in a way that is relevant to them, in an easy to understand, easily digestible, and aesthetically pleasing way. Results must be determined without user demand or context such as keywords, entering demographic data, or other information. This problem is especially important in the context of mobile applications, where the user's context is continuously changing.

Current solutions to this problem are subpar. Typically, the success of these systems is limited to the small percentage of documents that contain geocoded information, relying on geo-proximity based on geo-feature detection. Furthermore, traditional methods primarily use distance from location to predict relevancy. Additional information dimensions are important, and existing rankings do not address these dimensions.

In some example embodiments, a corpus of documents, labeled with the following features (when available), serves as input to the system: precise location information (latitude, longitude); vague location information (association with a place, e.g. Austin, Tex., from which can be derived an explicit latitude and longitude using e.g. the Google geocoding API); time of publication; images associated with the document, graded for visual appeal; user metrics (total view count).

These documents are indexed, in some exmaples, with the features, using a search indexing system, such as the open source "elasticsearch" project. When a user requests local content, a query is constructed as described below and passed to the search indexing system, which returns documents sorted according to the query. These documents are presented to the user.

Before a user requests documents, the user's location is computed either by IP geolocation (e.g. using the service provided by freegeoip.net), by accessing a GPS attached to the user's device, or by geocoding a location string explicitly entered by the user (e.g. using the Google geocoding API). This location can be used to construct a query part which ranks documents according to their distance from the location. For example, the query part may compute the geographical distance from the user's location to the document's latitude/longitude, then map this distance into a score using an exponential decay function:

$$score_{dist} = e^{-kappa \cdot dist(location(user), location(doc))}$$

where kappa is a manually chosen parameter configuring the rate at which the score decreases with increasing geographical distance.

Similarly, another query part may compute the distance in time from the time the user requested documents to the publication time of the document:

$$score_{time}=e^{-lambda*dist(current\_time,publication\_time(doc))}$$

where, similarly, lambda is a manually chosen parameter configuring the rate at which the score decreases with increasing distance in time.

Another query part may compute a score based on the grade for the highest graded image associated with the document:

$$score_{image}=grade(best\_image(doc)); \text{ if has\_image}(doc)$$

0; otherwise

Lastly, a query part may compute a score based on the user metrics associated with the document:

$$score_{metrics}=1/(1+e^{(mu-view\_count(doc))/nu})$$

where mu is a manually chosen parameter which configures the view count at which scoremetrics is equal to 0.5, and nu is a manually chosen parameter which configures the steepness of the response of scoremetrics to the view count. This allows a configurable sensitivity to the view count, while 'saturating' so that documents with very high view counts receive a scoremetrics of no more than 1, preventing this query part from dominating the score computation for such documents.

The entire query may then be constructed by multiplying each part by a configurable weight and adding the results:

$$score=Wdist*scoredist+Wtime*scoretime+Wimage*scoreimage+Wmetrics*scoremetrics$$

The search indexing system, given this query, returns documents sorted in decreasing score order, and these are presented to the user.

In the foregoing specification, the invention has been described with reference to specific embodiments. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of invention.

Many modifications and other embodiments of the inventions set forth herein will come to mind to one skilled in the art to which these embodiments of the invention pertain having the benefit of the teachings presented in the foregoing descriptions and the associated drawings. Therefore, it is to be understood that the embodiments of the invention are not to be limited to the specific embodiments disclosed and that modifications and other embodiments are intended to be included within the scope of the appended claims. Although specific terms are employed herein, they are used in a generic and descriptive sense only and not for purposes of limitation.

That which is claimed:

1. A computer-implemented method, comprising:
   receiving a feature vector r that represents occurrence counts of references in a document's text to each of a group of named entities, wherein a particular named entity within the group of named entities is associated with a particular location; and
   determining, by a processor, whether the document is associated with the particular location by performing operations comprising:
   querying, to determine a query result, using feature vector r, at least one location-specific classifier from a group of location-specific classifiers, wherein the location-specific classifier is associated with the particular location, and wherein the location-specific classifier is configured to generate a positive output value in response to receiving an input feature vector representing occurrence count of at least one reference to the particular named entity; and
   determining that the document is associated with the particular location in an instance in which the query result includes data indicating that the positive output value was generated by the location-specific classifier that is associated with the particular location,
   wherein feature vector r is a vector of values with each element of feature vector r being an occurrence count of references within the document's text to one of the group of named entities, each element having an index position,
   wherein generating the feature vector r comprises:
   for each named entity in the group of named entities, generating a reference bit vector for each reference within the document's text to the named entity; and
   calculating a sum vector from the generated reference bit vectors.

2. The method of claim 1, the operations further comprising:
   determining that the document is not associated with the particular location in an instance in which the query result does not include data indicating that the positive output value was generated by the location-specific classifier that is associated with the particular location.

3. The method of claim 1, wherein the particular location is from a hierarchy of locations, each location respectively being associated with a corresponding location-specific classifier from the group of location-specific classifiers, wherein each location within the hierarchy represents a more specific location than its parent location.

4. The method of claim 3, wherein each of the group of location-specific classifiers is a trainable classifier adapted using supervised learning, and wherein the location-specific classifier that is associated with the particular location is adapted based on a training data set of exemplary feature vectors, each exemplary feature vector respectively representing occurrence counts of references in an exemplary document's text to each of the group of named entities.

5. The method of claim 4, wherein the exemplary document is determined, based on the hierarchy of locations, to be associated with a relevant location to the particular location.

6. The method of claim 4, further comprising:
   applying a weighting scheme to improve performance of the location-specific classifier that is associated with the particular location.

7. The method of claim 1, wherein feature vector r of a dimensionality d that is equal to the size of the group of named entities, and wherein the reference bit vector for a named entity is a bit vector of dimensionality d with a value of 1 at the bit vector element index position corresponding to the feature vector r element index position representing the occurrence count of references to the named entity.

8. The method of claim 1, wherein feature vector r is a vector of values of a fixed dimensionality d that is less than the size of the group of named entities, and wherein the reference bit vector for a named entity is a bit vector of dimensionality d with a value of 1 at each of k index positions, where k is greater than or equal to 2, and the k index positions are chosen at random to indicate the named entity.

9. A system, comprising:
one or more computers and one or more storage devices storing instructions that are operable, when executed by the one or more computers, to cause the one or more computers to perform first operations comprising:
receiving a feature vector r that represents occurrence counts of references in a document's text to each of a group of named entities, wherein a particular named entity within the group of named entities is associated with a particular location; and
determining whether the document is associated with the particular location by performing second operations comprising:
querying, to determine a query result, using feature vector r, at least one location-specific classifier from a group of location-specific classifiers, wherein the location-specific classifier is associated with the particular location, and wherein the location-specific classifier is configured to generate a positive output value in response to receiving an input feature vector representing occurrence count of at least one reference to the particular named entity; and
determining that the document is associated with the particular location in an instance in which the query result includes data indicating that the positive output value was generated by the location-specific classifier that is associated with the particular location,
wherein feature vector r is a vector of values with each element of feature vector r being an occurrence count of references within the document's text to one of the group of named entities, each element having an index position,
wherein generating the feature vector r comprises:
for each named entity in the group of named entities, generating a reference bit vector for each reference within the document's text to the named entity; and
calculating a sum vector from the generated reference bit vectors.

10. The system of claim 9, the second operations further comprising:
determining that the document is not associated with the particular location in an instance in which the query result does not include data indicating that the positive output value was generated by the location-specific classifier that is associated with the particular location.

11. The system of claim 9, wherein the particular location is from a hierarchy of locations, each location respectively being associated with a corresponding location-specific classifier from the group of location-specific classifiers, wherein each location within the hierarchy represents a more specific location than its parent location.

12. The system of claim 11, wherein each of the group of location-specific classifiers is a trainable classifier adapted using supervised learning, and wherein the location-specific classifier that is associated with the particular location is adapted based on a training data set of exemplary feature vectors, each exemplary feature vector respectively representing occurrence counts of references in an exemplary document's text to each of the group of named entities.

13. The system of claim 12, wherein the exemplary document is determined, based on the hierarchy of locations, to be associated with a relevant location to the particular location.

14. The system of claim 12, further comprising:
applying a weighting scheme to improve performance of the location-specific classifier that is associated with the particular location.

15. The system of claim 9, wherein feature vector r of a dimensionality d that is equal to the size of the group of named entities, and wherein the reference bit vector for a named entity is a bit vector of dimensionality d with a value of 1 at the bit vector element index position corresponding to the feature vector r element index position representing the occurrence count of references to the named entity.

16. The system of claim 9, wherein feature vector r is a vector of values of a fixed dimensionality d that is less than the size of the group of named entities, and wherein the reference bit vector for a named entity is a bit vector of dimensionality d with a value of 1 at each of k index positions, where k is greater than or equal to 2, and the k index positions are chosen at random to indicate the named entity.

17. A computer program product, encoded on a computer-readable medium, operable to cause data processing apparatus to perform first operations comprising:
receiving a feature vector r that represents occurrence counts of references in a document's text to each of a group of named entities, wherein a particular named entity within the group of named entities is associated with a particular location; and
determining whether the document is associated with the particular location by performing second operations comprising:
querying, to determine a query result, using feature vector r, at least one location-specific classifier from a group of location-specific classifiers, wherein the location-specific classifier is associated with the particular location, and wherein the location-specific classifier is configured to generate a positive output value in response to receiving an input feature vector representing occurrence count of at least one reference to the particular named entity; and
determining that the document is associated with the particular location in an instance in which the query result includes data indicating that the positive output value was generated by the location-specific classifier that is associated with the particular location,
wherein feature vector r is a vector of values with each element of feature vector r being an occurrence count of references within the document's text to one of the group of named entities, each element having an index position,
wherein generating the feature vector r comprises:
for each named entity in the group of named entities, generating a reference bit vector for each reference within the document's text to the named entity; and
calculating a sum vector from the generated reference bit vectors.

18. The computer program product of claim 17, the second operations further comprising:
determining that the document is not associated with the particular location in an instance in which the query result does not include data indicating that the positive output value was generated by the location-specific classifier that is associated with the particular location.

19. The computer program product of claim 17, wherein the particular location is from a hierarchy of locations, each location respectively being associated with a corresponding location-specific classifier from the group of location-specific classifiers, wherein each location within the hierarchy represents a more specific location than its parent location.

20. The computer program product of claim 19, wherein each of the group of location-specific classifiers is a trainable classifier adapted using supervised learning, and wherein the location-specific classifier that is associated with the particular location is adapted based on a training data set of exemplary feature vectors, each exemplary feature vector respectively representing occurrence counts of references in an exemplary document's text to each of the group of named entities.

21. The computer program product of claim 20, wherein the exemplary document is determined, based on the hierarchy of locations, to be associated with a relevant location to the particular location.

22. The computer program product of claim 20, further comprising:

applying a weighting scheme to improve performance of the location-specific classifier that is associated with the particular location.

23. The computer program product of claim 17, wherein feature vector r of a dimensionality d that is equal to the size of the group of named entities, and wherein the reference bit vector for a named entity is a bit vector of dimensionality d with a value of 1 at the bit vector element index position corresponding to the feature vector r element index position representing the occurrence count of references to the named entity.

24. The computer program product of claim 17, wherein feature vector r is a vector of values of a fixed dimensionality d that is less than the size of the group of named entities, and wherein the reference bit vector for a named entity is a bit vector of dimensionality d with a value of 1 at each of k index positions, where k is greater than or equal to 2, and the k index positions are chosen at random to indicate the named entity.

\* \* \* \* \*